US008567311B2

(12) United States Patent
Kraus

(10) Patent No.: US 8,567,311 B2
(45) Date of Patent: Oct. 29, 2013

(54) CONTROL LOGIC FOR APPLYING PRESERVATIVE TO AGRICULTURAL BALES

(75) Inventor: Timothy J. Kraus, Blakesburg, IA (US)

(73) Assignee: Deere & Company, Moline, IL (US)

( * ) Notice: Subject to any disclaimer, the term of this patent is extended or adjusted under 35 U.S.C. 154(b) by 268 days.

(21) Appl. No.: 12/913,968

(22) Filed: Oct. 28, 2010

(65) Prior Publication Data
US 2012/0103207 A1    May 3, 2012

(51) Int. Cl.
A01F 15/07    (2006.01)
A01F 15/08    (2006.01)
B30B 15/26    (2006.01)

(52) U.S. Cl.
USPC .................... 100/35; 100/45; 100/73; 100/74

(58) Field of Classification Search
USPC ............................... 100/35, 45, 73, 74; 53/431
See application file for complete search history.

(56) References Cited

U.S. PATENT DOCUMENTS

| 4,453,460 A * | 6/1984 | Rabe et al. ........................ 100/73 |
| 4,772,481 A * | 9/1988 | Rohwer et al. ................ 426/335 |
| 4,822,624 A * | 4/1989 | Young .............................. 426/53 |
| 4,918,910 A * | 4/1990 | Sheehan et al. ................. 56/341 |
| 5,185,024 A * | 2/1993 | Siemer et al. ................. 504/361 |
| 5,273,769 A * | 12/1993 | Lajoie et al. ................... 426/319 |
| 7,415,924 B2 * | 8/2008 | Roberts ......................... 100/102 |
| 7,743,699 B1 | 6/2010 | Freeman et al. |

FOREIGN PATENT DOCUMENTS

| DE | 3232746 | 3/1984 |
| EP | 0384714 | 8/1990 |

OTHER PUBLICATIONS

European Search Report, Feb. 14, 2012, 4 pages.

* cited by examiner

*Primary Examiner* — Jimmy T Nguyen

(57) ABSTRACT

A method and apparatus are provided for applying preservative to agricultural crops during baling. More particularly, a baler has a preservative application system and a crop moisture sensor array. The crop moisture sensor array is in communication with the preservative application system so that the application of preservative to the crop can be controlled in response to a moisture content sensed by the crop moisture sensor array that exceeds both a moisture content threshold value and a threshold value relating to the percentage of crop material having a moisture content above the moisture content threshold value.

2 Claims, 5 Drawing Sheets

CONTROL LOGIC FOR APPLYING PRESERVATIVE TO AGRICULTURAL BALES

FIELD OF THE INVENTION

The present invention relates to machines for forming cylindrical bales of crop material, such as hay, and particularly to an improved control logic using sensed crop moisture for applying a preservative to the crop material as the bale is being formed.

BACKGROUND OF THE INVENTION

In agriculture it is a well known practice to bale crop material using balers that create round or cylindrical bales. It is also a common practice to store such bales outdoors where they are exposed to the elements of rain and snow. Nearly all, round bales stored outside without some form of protection from rain and/or snow will experience mold growth in the outer rind of the bale. The potential benefits of applying mold inhibiting preservatives to hay either during a baling process or to the finished bale are well known and include (a) permitting the hay to be baled and stored at higher moisture contents without spoilage, thus reducing field losses and making the hay making operation less dependent on favorable weather conditions; (b) improved palatability and digestibility; and (c) higher nutrient content. The relative importance of these benefits varies with the crop being treated and the preservative used.

Accordingly, preparations of buffered propionic acid or anhydrous ammonia are sometimes applied to the hay at the time of baling to, prevent bacterial and mold growth. Typically, these preparations are applied to the entire bale as it is being formed or injected into the bale after formation. Because of this, there is a desire to apply the preservative only to the portion of the bale having a moisture content requiring preservative application.

Today there are several moisture sensors on the market that measure the moisture of hay as it is being baled. All of these systems use one or more sensors to estimate the average moisture of the hay being harvested. Some of these systems provide a means of applying crop preservative to the hay based on the average moisture level of the incoming crop. The problem with basing the preservative application rates on the average moisture level is that many times the average value appears to be at a suitable moisture level when in fact a significant portion of the crop is at high moisture level that requires a preservative for proper storage. For example, hay normally can be properly stored without applying a preservative at moisture levels less than 20% wet basis ($w_b$) wherein $w_b$=(weight of water)/(weight of crop material+water). If the incoming crop consisted of 75% of the crop being at 18% $w_b$ and 25% of the crop being at 25% $w_b$, the average value=19.25% $w_b$. Based on the average value, one would assume that the crop would not need to be treated with a preservative, when in reality it should have been.

Therefore, basing application rates on average hay moisture values does not allow one to recognize (or identify) that a problem exists and/or the extent of the problem.

Because of this, there is a desire to apply the preservative only to the portion of the bale having a moisture content requiring preservative application and/or applying the preservative at a controlled rate according to the sensed moisture content of incoming crop.

SUMMARY OF THE INVENTION

It is therefore an object of the invention to provide an improved control logic for applying a preservative to a bale as the bale is being formed at a controlled rate and/or only where needed based upon a sensed moisture content in the incoming crop material related to the overall moisture content of the crop material being baled.

This and other objects of the invention are accomplished by a method for applying a preservative to crop material during a baling process wherein a baler comprises a pickup device for picking up crop material from a windrow on the ground, a crop inlet to a baling chamber, at least one moisture sensor, the at least one moisture sensor sensing moisture in incoming crop material across an entire width of the crop inlet, a preservative application system for selectively applying preservative to the crop material as it is being baled and an Electronic Control Unit (ECU) for receiving data from the at least one moisture sensor and for selectively activating the preservative application system, the method comprising the steps of: inputting a high moisture set point in the ECU, the high moisture set point corresponding to a moisture content percentage of crop material entering the baler, below which it is deemed unnecessary to apply preservative; inputting a high moisture set point ratio in the ECU, the high moisture set point ratio corresponding to a percentage of incoming crop material that is above the high moisture set-point at which it is deemed necessary to apply preservative; inputting an application rate/high moisture ratio, the application rate/high moisture ratio corresponding to the rate at which it is deemed necessary to apply preservative to adequately preserve the crop material based upon the percentage of crop material being above the high moisture set-point ratio; commencing a baling process; sensing a moisture content of the incoming crop material; determining whether the sensed moisture content of incoming crop material one of meets and exceeds the high moisture set point; determining whether the sensed moisture content of incoming crop material one of meets and exceeds the high moisture set point ratio; activating the preservative application system to begin the application of preservative when both the high moisture set point and the high moisture set point ratio have been one of met and exceeded; and, adjusting the rate of preservative application to the application rate/high moisture ratio for the high moisture set-point ratio.

The objects of the invention are further accomplished by a method for applying a preservative to crop material during a baling process wherein a baler comprises a pickup device for picking up crop material from a windrow on the ground, a crop inlet to a baling chamber, at least one moisture sensor, the at least one moisture sensor sensing moisture in incoming crop material across an entire width of the crop inlet, a preservative application system for selectively applying preservative to the crop material as it is being baled and an Electronic Control Unit (ECU) for receiving data from the at least one moisture sensor and for selectively activating the preservative application system, the method comprising the steps of: inputting a high moisture set point in the ECU, the high moisture set point corresponding to a moisture content percentage of crop material entering the baler, below which it is deemed unnecessary to apply preservative; inputting a high moisture set point ratio in the ECU, the high moisture set point ratio corresponding to a percentage of incoming crop material that is above the high moisture set-point at which it is deemed necessary to apply preservative; inputting an application rate/high moisture ratio, the application rate/high moisture ratio corresponding to the rate at which it is deemed necessary to apply preservative to adequately preserve the crop material based upon the percentage of crop material being above the high moisture set-point ratio; commencing a baling process; sensing the moisture content of incoming crop material; determining whether the sensed moisture content of incoming crop material one of meets and exceeds the high moisture set point; determining whether the sensed moisture content of incoming crop material one of meets and exceeds the high moisture set point ratio; activating the preservative application system to begin the application of preservative when both the high moisture set point and the high moisture set point ratio have been one of met and exceeded; and, adjusting the rate of preservative application to the application rate/high moisture ratio for the high moisture set-point ratio and the sensed moisture content of the high moisture crop material entering the baling chamber.

Further objects of the invention are accomplished by an improved agricultural baler having a preservative application system and an Electronic Control Unit (ECU) controlling the preservative application system, the improvement comprising: a moisture sensor array sensing the moisture content of crop material entering the baler, the moisture sensor array being in communication with the ECU; the ECU being programmed to control the preservative application system at an application rate based upon a percentage of crop material entering the baler that exceeds a threshold percentage of crop material above a threshold moisture content value.

In general a method and apparatus are provided for applying preservative to agricultural crops during baling. More particularly, a baler has a preservative application system and a crop moisture sensor array. The crop moisture sensor array is in communication with the preservative application system so that the application of preservative to the crop can be controlled in response to a moisture content sensed by the crop moisture sensor array that exceeds both a moisture content threshold value and a threshold value relating to the percentage of crop material having a moisture content above the moisture content threshold value.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
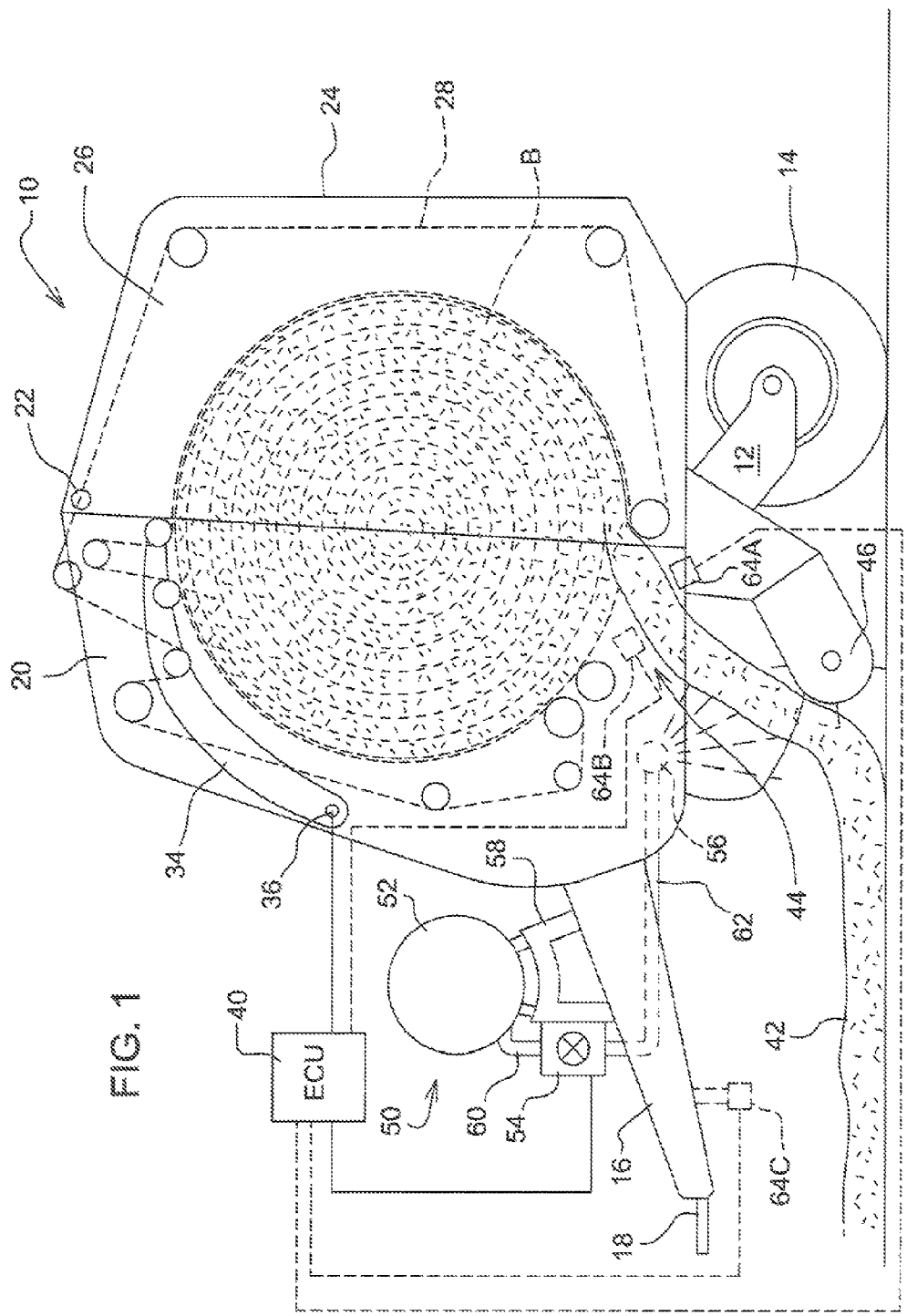
FIG. 1 is an elevational view of a round baler employing the apparatus according to the invention.

Referring now to FIG. 1 it can be seen that a round baler is generally designated by the numeral 10. The baler 10 is in many respects conventional in its arrangement and includes a main frame 12 supported on a pair of ground wheels 14. A draft tongue 16 has a rear end joined to the frame 12 and has a forward end defined by a clevis arrangement 18 adapted for being coupled to a towing vehicle (not shown). A pair of upright side walls 20 are fixed to the main frame 12 and define forward regions of opposite side walls of a baling chamber. Mounted for pivoting vertically about a horizontal pivot arrangement 22 located at an upper rear location of the side walls 20 is a discharge gate 24 including opposite upright side walls 26, which define opposite sides of a rear region of the baling chamber. A gate cylinder arrangement (not shown) is coupled between the main frame 12 and the opposite side walls 26 of the discharge gate 24 and is selectively operable for moving the discharge gate 24 between a lowered baling position and an opened discharge position. Baler 10 is of a variable size chamber design and thus comprises a plurality of longitudinally extending side-by-side belts 28 supported on a plurality of rollers 30 (only a few of which are shown). A bale forming chamber is defined by the sidewalls 20, 26, the rollers 30 and belts 28.

As mentioned previously, the baler 10 illustrated is a variable chamber design wherein crop is rolled up in a spiral fashion in a nip formed between oppositely moving adjacent loops of belts 28. The space between adjacent loops of belts 28 grows as the forming bale B grows larger. Accordingly, a belt tensioning device 34 is provided to take up slack in the belts 28 as needed. Thus the position of the tensioning device 34, at any given time, is an indication of the size of the bale B at that time. A bale diameter sensor 36 in the form of a potentiometer is affixed to the pivot point of the tensioning device 34 and thus provides an electrical signal correlating with bale diameter to an Electronic Control Unit (ECU) 40. The ECU 40, via appropriate logic, can then translate the signal into meaningful bale size data that can be communicated to an operator by way of an appropriate display device (not shown). In addition to providing an indication of bale size to the operator, the ECU 40 can be adapted to utilize bale diameter data for other purposes such as triggering a twine or wrapping cycle, opening the discharge gate, initiating bale discharge, or to control the application of preservative to the bale.

In its general operation the baler 10 is drawn through a field by a prime mover (not shown) attached to the tongue 16. Crop material 42 is fed into a crop inlet 44 of the bale forming chamber from a windrow of crop on the ground by a pickup 46. In the baler 10, the crop material 42 is rolled in spiral fashion as described above into the cylindrical bale B. Upon completion, the bale B is wrapped with twine or other appropriate wrapping material and is discharged by actuation of gate cylinders that open gate 24 permitting the completed bale B to be discharged from the baler 10 onto the ground.

Figure 2:
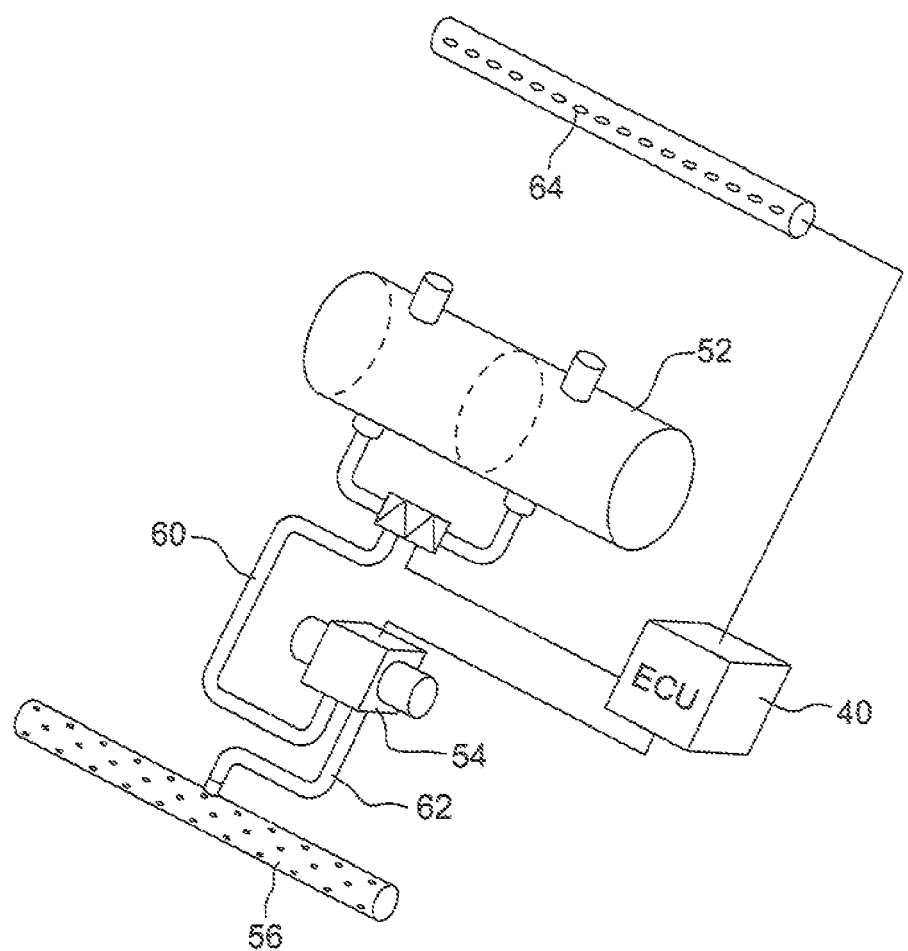
FIG. 2 is a perspective partially schematic view of a preservative application system according to the invention.

With continued reference to FIG. 1 and also now to FIG. 2 it can be seen that the baler 10 further includes a preservative application system 50 that comprises at least one storage container such as holding tank 52, a transfer device such as a variable speed pump 54 and an applicator device 56. It will be recognized as the description continues, that various alternative embodiments of the preservative application system are possible. For example the variable speed pump could be a fixed speed pump, or in place of a pump, the system could have a pressurized tank and valve system or a gravity feed and valve system. As illustrated the holding tank 52 and pump 54 are mounted upon a frame 58 above the tongue 16 at the front of the baler 10. It will, however, be recognized that the tank and pump could be mounted at another location. The applicator device 56 as shown is in the form of an elongated spray bar that generally spans the width of the baling chamber and is mounted just ahead of and above the crop inlet 44 of the baler. It will be recognized that instead of an elongated spray bar, the system could employ other means for applying the preservative such as nozzles having fixed or adjustable spray patterns. The tank 52 is connected to the pump 54 by way of a hose 60, and the pump 54 is, in turn, connected to the applicator device 56 by a hose 62. Thus, when the pump 54 is activated, preservative is drawn from the tank 52 via the hose 60 and sent to the applicator device 56 via the hose 62. Preservative is expelled from the spray bar in a pattern designed to ensure contact with the incoming crop material.

The ECU 40 is connected to and controls the pump 54 by way of appropriate logic to start and stop the pump 54 and/or to control the speed of the pump and therefore the application rate of the preservative. Logic can be programmed in the ECU 40 to start/stop and/or vary the speed of the pump 54 based upon data provided to the ECU 40 from various sensors on the baler as described in more detail below.

Figure 3:
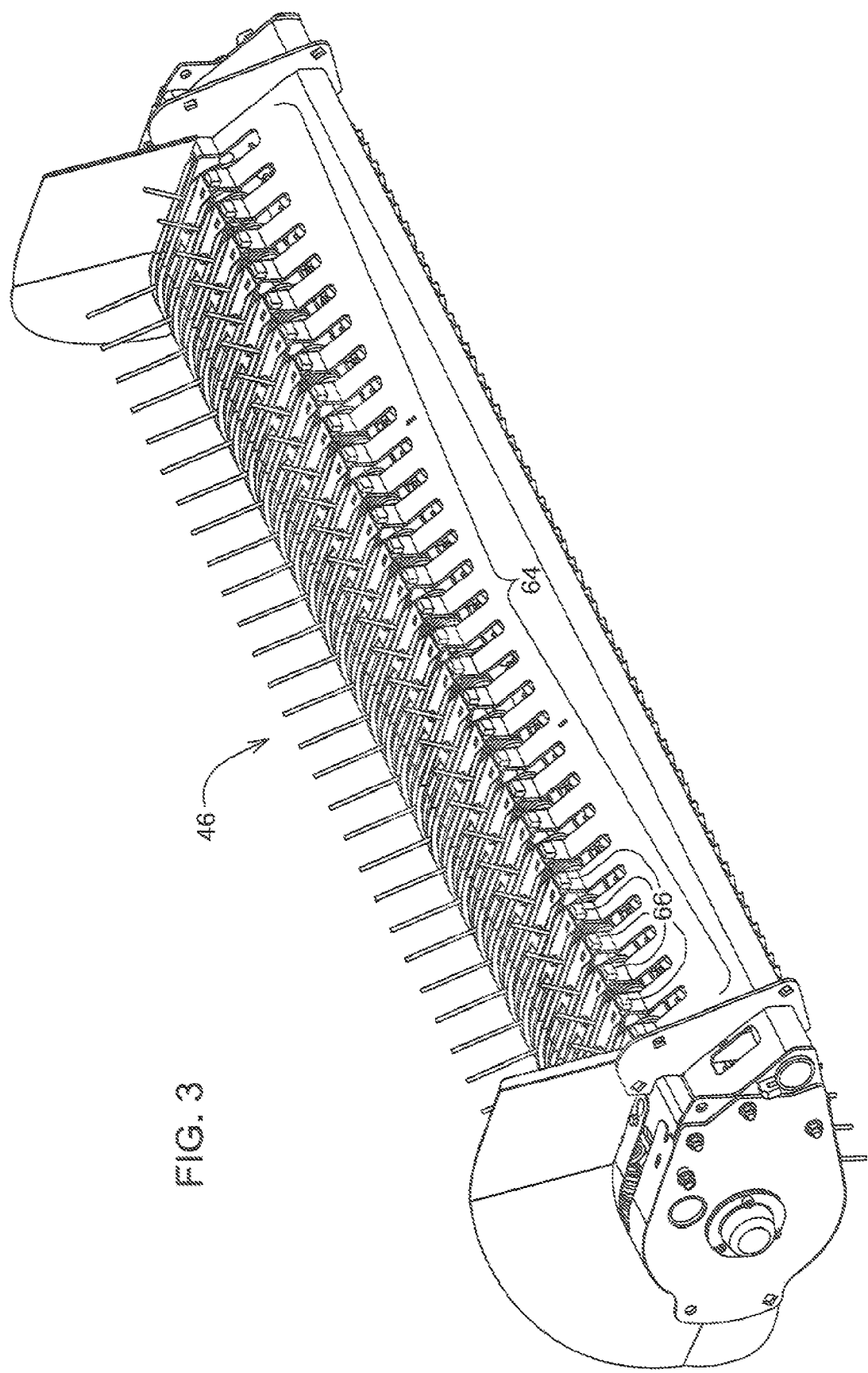
FIG. 3 is a perspective view of a portion of a crop pick-up device for the round baler of FIG. 1 having a moisture sensor array.

The disclosure thus far has described a baler having a preservative application system as is known in the art. The description which follows describes the novel embodiments of the invention. With continuing reference to FIGS. 1 and 2 and also with reference to FIG. 3, it can be seen that the baler 10 is further provided with an array of moisture sensors 64 that are preferably distributed across the width of the baler (FIG. 3) and preferably below the flow of incoming crop material as indicated by the sensor array 64A in FIG. 1. It is also possible to mount the moisture sensor array 64 at other locations on the baler such as above the flow of incoming crop material as it enters the crop inlet as indicated by the sensor array 64B in FIG. 1 or for example on the draft tongue 16 of the baler so that incoming crop moisture is sensed while the crop is still on the ground as indicated by the sensor array 64C in FIG. 1. The possible locations for the moisture sensor array 64 are shown by way of example only. It is contemplated that the sensor array 64 can be located at other locations on the baler 10 that are not specifically shown or described—it only being necessary that the moisture sensors be positioned to monitor moisture content at the time or shortly before crop enters the crop inlet.

The moisture sensor array 64 is preferably comprised of a plurality of sensor elements 66 evenly distributed across the width of the baler 10. It is contemplated that such sensor elements 66 could be of the conductive, fringe capacitance microwave, transmitted microwave, or Near Infrared (NIR) type, as well as other sensors capable of determining moisture content in the incoming crop material. It is also possible that with certain sensors having the capability of measuring the moisture content of incoming crop material across the baler width, it may not be necessary to provide multiple sensors but instead a single sensor may be adequate. Regardless of the type of moisture sensors employed, the output of the sensor array 64 is communicated to the ECU 40 by way of a wired or wireless connection. The ECU 40 then uses the sensed moisture readings of the sensor array 64 to control the application of preservative as will be described in more detail below.

Figure 4:
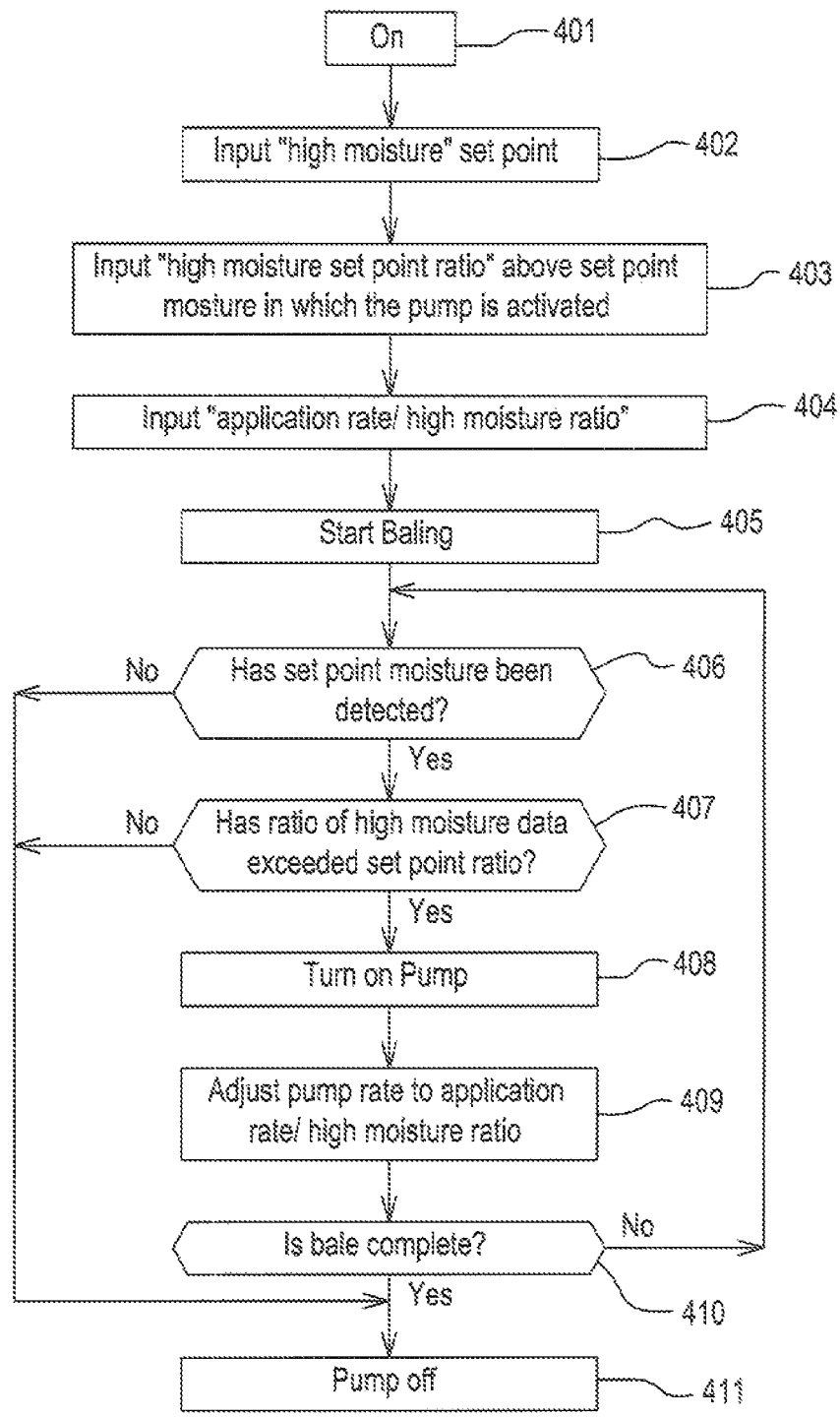
FIG. 4 is a flowchart showing the logic of a first embodiment of the method; and, FIG. 5 is a flowchart showing the logic of another embodiment of the method.

With reference now to FIG. 4 a preservative application control scheme is set forth in a flowchart generally illustrating the logic used by the ECU to apply preservative. More particularly, FIG. 4 illustrates an embodiment wherein the control logic applies preservative in proportion to the fraction of crop that exceeds a set-point moisture content. Specifically, after the start at 401 an operator inputs a "High Moisture Set-Point" at 402. This "High Moisture Set-Point" represents a moisture content percentage of crop material entering the baler, below which it is unnecessary to apply preservative. At 403 the operator inputs a "High Moisture Set-Point Ratio" that is above the "High Moisture Set-Point". The "High Moisture Set-Point Ratio" represents a percentage of incoming crop material that is above the "High Moisture Set-Point" at which it is deemed necessary to apply preservative. Next at 404 the operator inputs an "Application Rate/High Moisture Ratio". The "Application Rate/High Moisture Ratio" represents the rate at which it is deemed necessary to apply preservative to adequately preserve the crop material based upon the crop material being above the "High Moisture Set-Point Ratio". At 405 the baling operation is commenced. At 406 the logic queries whether the "High Moisture Set-Point" has been met or exceeded. If the answer is no, then the application system remains off. If at 406 the answer is yes, then at 407 the logic queries whether the "High Moisture Set-Point Ratio" has been met or exceeded. If the answer at 407 is yes, then the pump is turned on at 408 and the application rate is adjusted at 409 according to the "Application Rate/High Moisture Ratio" set at 404. Next at 410 the logic queries whether the bale has been completed. If the answer at 410 is yes, the pump is turned off at 411. If the answer at 410 is no, the logic reverts to 406.

Figure 5:
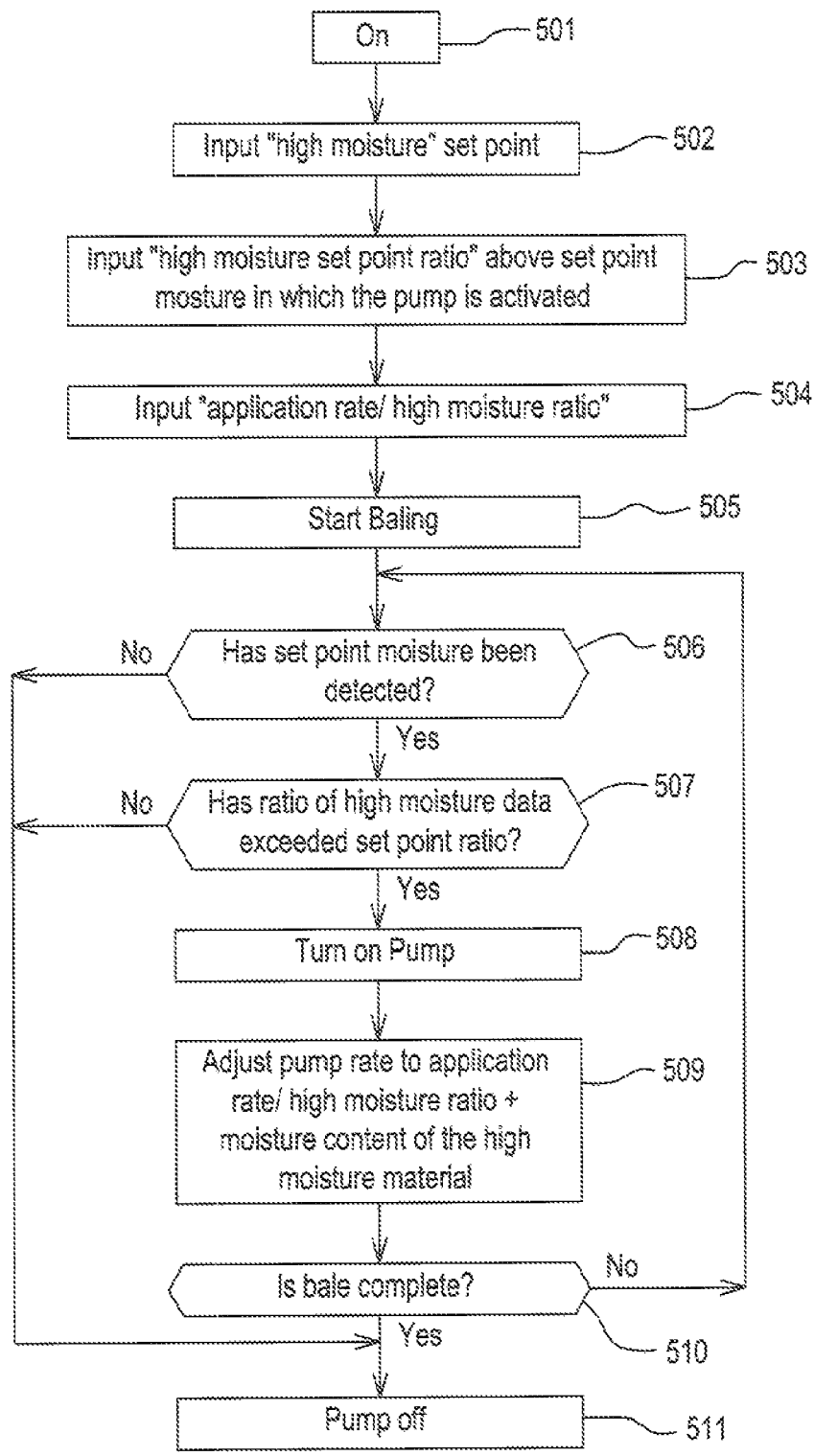

In an alternative embodiment set forth in the flowchart of FIG. 5 the logic used by the ECU to apply preservative is based upon applying preservative to: the fraction of the crop that exceeds the set point moisture content and the actual moisture of the crop material that exceeds the set point moisture. This method requires more accurate sensors than the embodiment of FIG. 4, in that in FIG. 4 it is only necessary to determine the percentage of the crop material exceeding the "High Moisture Set-Point Ratio" wherein the embodiment of FIG. 5 requires a more accurate determination of the actual moisture content of the high moisture material. Specifically, after the start at 501 the operator inputs a "High Moisture Set-Point" at 502. As in the embodiment of FIG. 4 this "High Moisture Set-Point" represents a moisture content percentage of crop material entering the baler, below which it is unnecessary to apply preservative. At 503 the operator inputs a "High Moisture Set-Point Ratio" that is above the "High Moisture Set-Point". As in the embodiment of FIG. 4 this "High Moisture Set-Point Ratio" represents a percentage of incoming crop material that is above the "High Moisture Set-Point" at which it is deemed necessary to apply preservative. At 504 the operator inputs an "Application Rate/High Moisture Ratio". The "Application Rate/High Moisture Ratio", as in the previous embodiment, represents the rate at which it is deemed necessary to apply preservative to adequately preserve the crop material based upon the crop material being above the "High Moisture Set-Point Ratio". At 505 the baling operation commences. At 506 the logic queries whether the "High Moisture Set-Point" input at 502 has been met or exceeded. If the answer is no, then the application system remains off. If at 506 the answer is yes then at 507 the logic queries whether the "High Moisture Set-Point Ratio" has been met or exceeded. If the answer at 507 is yes, then the pump is turned on at 508. At 509 unlike the previous embodiment the application rate is adjusted to not only the "Application Rate/High Moisture Ratio" but also based upon the actual moisture content of the high moisture material entering the baler. This allows for a more accurate and efficient application of preservative based not just upon the fact that material entering the baler is above the "High Moisture Set-Point Ratio", but also compensates for the actual moisture content of this sensed high moisture material. Next at 510 the logic queries whether the bale has been completed. If the answer at 510 is yes, the pump is turned off at 511. If the answer at 510 is no, the logic reverts to 506.

It should now be apparent that the array of moisture sensors allows the variation in moisture levels of the harvested'crop to be measured. Rather than averaging the moisture levels to determine the appropriate application rate of the preservative, the application rate is derived based on the fraction of crop that exceeds a critical level for proper storage. For example if 10% of the crop exceeds a critical moisture level, an application rate of X is applied. However, if 20% of the crop exceeds a critical level, an application rate of Y is applied to the crop. Basing the application rate on the fraction of crop that exceeds a critical value (rather than the average moisture value) allows one to identify when a preservative is needed and provides more effective and efficient use of the preservatives.

Having described the preferred embodiments it should now be apparent that alternatives are contemplated wherein the method and apparatus of the invention are utilized with either fixed or variable chamber round balers, as well as a variety of available moisture sensors, and can be utilized with both fluid and dry preservatives provided that appropriate storage, transfer and applicator devices suitable to the preservative are utilized.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims, when interpreted in accordance with the breadth to which they are fairly and legally entitled.

The embodiments of the invention in which an exclusive property or privilege is claimed are defined as follows:

1. A method for applying a preservative to crop material during a baling process wherein a baler comprises a pickup device for picking up crop material from a windrow on the ground, a crop inlet to a baling chamber, at least one moisture sensor, the at least one moisture sensor sensing moisture in incoming crop material across an entire width of the crop inlet, a preservative application system for selectively applying preservative to the crop material as it is being baled and an Electronic Control Unit (ECU) for receiving data from the at least one moisture sensor and for selectively activating the preservative application system, the method comprising the steps of:

inputting a high moisture set point in the ECU, the high moisture set point corresponding to a moisture content percentage of crop material entering the baler, below which it is deemed unnecessary to apply preservative;
   inputting a high moisture set point ratio in the ECU, the high moisture set point ratio corresponding to a percentage of incoming crop material that is above the high moisture set-point at which it is deemed necessary to apply preservative;
   inputting an application rate/high moisture ratio, the application rate/high moisture ratio corresponding to the rate at which it is deemed necessary to apply preservative to adequately preserve the crop material based upon the percentage of crop material being above the high moisture set-point ratio;
   commencing a baling process;
   sensing a moisture content of the incoming crop material;
   determining whether the sensed moisture content of incoming crop material one of meets and exceeds the high moisture set point;
   determining whether the sensed moisture content of incoming crop material one of meets and exceeds the high moisture set point ratio;
   activating the preservative application system to begin the application of preservative when both the high moisture set point and the high moisture set point ratio have been one of met and exceeded; and,
   adjusting the rate of preservative application to the application rate/high moisture ratio for the high moisture set-point ratio.

2. A method for applying a preservative to crop material during a baling process wherein a baler comprises a pickup device for picking up crop material from a windrow on the ground, a crop inlet to a baling chamber, at least one moisture sensor, the at least one moisture sensor sensing moisture in incoming crop material across an entire width of the crop inlet, a preservative application system for selectively applying preservative to the crop material as it is being baled and an Electronic Control Unit (ECU) for receiving data from the at least one moisture sensor and for selectively activating the preservative application system, the method comprising the steps of:

inputting a high moisture set point in the ECU, the high moisture set point corresponding to a moisture content percentage of crop material entering the baler, below which it is deemed unnecessary to apply preservative;
   inputting a high moisture set point ratio in the ECU, the high moisture set point ratio corresponding to a percentage of incoming crop material that is above the high moisture set-point at which it is deemed necessary to apply preservative;
   inputting an application rate/high moisture ratio, the application rate/high moisture ratio corresponding to the rate at which it is deemed necessary to apply preservative to adequately preserve the crop material based upon the percentage of crop material being above the high moisture set-point ratio;
   commencing a baling process;
   sensing the moisture content of incoming crop material;
   determining whether the sensed moisture content of incoming crop material one of meets and exceeds the high moisture set point;
   determining whether the sensed moisture content of incoming crop material one of meets and exceeds the high moisture set point ratio;
   activating the preservative application system to begin the application of preservative when both the high moisture set point and the high moisture set point ratio have been one of met and exceeded; and,
   adjusting the rate of preservative application to the application rate/high moisture ratio for the high moisture set-point ratio and the sensed moisture content of the high moisture crop material entering the baling chamber.

* * * * *